(12) United States Patent
Baruzzini et al.

(10) Patent No.: US 10,054,048 B2
(45) Date of Patent: Aug. 21, 2018

(54) SUPRRESSION OF SHOCK-INDUCED AIRFLOW SEPARATION

(71) Applicant: Lockheed Martin Corporation, Bethesda, MD (US)

(72) Inventors: Dan J. Baruzzini, Keller, TX (US); Daniel N. Miller, Bainbridge Island, WA (US); Neal D. Domel, Fort Worth, TX (US); Jeff G. Hakes, Mansfield, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 892 days.

(21) Appl. No.: 13/952,088

(22) Filed: Jul. 26, 2013

(65) Prior Publication Data

US 2015/0027545 A1 Jan. 29, 2015

(51) Int. Cl.
*B64C 21/04* (2006.01)
*F02C 7/04* (2006.01)
*F15D 1/00* (2006.01)
*B64C 21/02* (2006.01)
*B64D 33/02* (2006.01)

(52) U.S. Cl.
CPC .............. *F02C 7/04* (2013.01); *B64C 21/025* (2013.01); *F15D 1/0095* (2013.01); *B64D 2033/026* (2013.01); *B64D 2033/0226* (2013.01); *Y02T 50/166* (2013.01); *Y10T 137/0318* (2015.04); *Y10T 137/0536* (2015.04)

(58) Field of Classification Search
CPC ........ F01D 5/187; F01D 5/186; F15D 1/0055; F15D 1/008; F02C 7/042; F02C 7/04; F02C 7/045; B64D 33/02; B64D 2033/026; B64D 2033/0226; B64D 2033/02; Y02T 50/166; Y02T 50/44; B64C 23/005; B64C 2230/06; B64C 2700/6271; B64C 23/06; B64C 23/00; B64C 21/025; B64C 21/06; B64C 21/04; B64C 30/00; B64C 23/04
See application file for complete search history.

(56) References Cited

U.S. PATENT DOCUMENTS 2,841,344 A * 7/1958 Stroukoff ...................... 244/208
3,054,255 A * 9/1962 Stratford ...................... 137/15.1
(Continued)

FOREIGN PATENT DOCUMENTS

EP 2272753 A1 1/2011

OTHER PUBLICATIONS

Gopi Krishnan, Kamran Mohseni; An Experimental Study of a Radial Wall Jet Formed by the Normal Impingement of a Round Synthetic Jet; European Journal of Mechanics B/Fluids; pp. 269-277.

(Continued)

*Primary Examiner* — Medhat Badawi
(74) *Attorney, Agent, or Firm* — Reising Ethington P.C.

(57) ABSTRACT

An apparatus for suppressing shock-induced separation of high speed airflow from a relatively low-energy boundary layer. The apparatus may include an actuator or array of actuators configured to alternately inhale and exhale fluid and positioned to alternately inhale fluid from and exhale fluid into a boundary layer of a fluid mass flowing along the wall. The actuator may be positioned to inhale fluid from a boundary layer separation bubble induced by a supersonic shock wave propagated in the fluid mass.

20 Claims, 5 Drawing Sheets

(56) References Cited

U.S. PATENT DOCUMENTS

| | | | |
|---|---|---|---|
| 3,417,767 A * | 12/1968 | Young | 137/15.2 |
| 4,000,869 A * | 1/1977 | Wong et al. | 244/53 B |
| 4,534,702 A * | 8/1985 | Johnson et al. | 416/20 R |
| 4,802,642 A * | 2/1989 | Mangiarotty | 244/200 |
| 5,447,283 A * | 9/1995 | Tindell | 244/207 |
| 5,938,404 A * | 8/1999 | Domzalski et al. | 416/91 |
| 6,092,990 A * | 7/2000 | Hassan et al. | 416/42 |
| 6,234,751 B1 * | 5/2001 | Hassan et al. | 416/42 |
| 6,375,118 B1 * | 4/2002 | Kibens et al. | 244/53 R |
| 6,457,654 B1 * | 10/2002 | Glezer et al. | 239/4 |
| 6,471,477 B2 * | 10/2002 | Hassan et al. | 416/90 A |
| 6,793,175 B1 * | 9/2004 | Sanders | B64C 30/00 |
| | | | 137/15.1 |
| 6,994,297 B1 * | 2/2006 | Hassan | B64C 9/38 |
| | | | 244/204 |
| 7,048,229 B2 * | 5/2006 | Sanders et al. | 244/53 B |
| 7,104,498 B2 * | 9/2006 | Englar et al. | 244/12.6 |
| 7,296,395 B1 | 11/2007 | Hartman et al. | |
| 7,750,491 B2 * | 7/2010 | Sankrithi | 290/54 |
| 7,767,447 B2 * | 8/2010 | Breidenthal et al. | 435/303.1 |
| 8,006,917 B2 * | 8/2011 | Arik et al. | 239/102.2 |
| 8,186,942 B2 * | 5/2012 | Haas | 415/145 |
| 8,192,147 B2 * | 6/2012 | Haas | 415/144 |
| 8,220,753 B2 * | 7/2012 | Silkey et al. | 244/205 |
| 8,234,869 B2 * | 8/2012 | Tuan | 60/725 |
| 8,267,653 B2 | 9/2012 | Nies et al. | |
| 8,282,037 B2 * | 10/2012 | Jain | 244/53 B |
| 8,316,631 B2 * | 11/2012 | Miller et al. | 60/204 |
| 8,348,200 B2 * | 1/2013 | Saddoughi et al. | 244/208 |
| 8,382,043 B1 * | 2/2013 | Raghu | B64C 21/04 |
| | | | 244/1 N |
| 8,523,115 B2 * | 9/2013 | Essenhigh et al. | 244/205 |
| 8,645,007 B2 * | 2/2014 | Golling et al. | 701/3 |
| 8,672,532 B2 * | 3/2014 | Jovanovich et al. | 366/181.5 |
| 8,876,064 B2 * | 11/2014 | Seifert et al. | 244/208 |
| 8,931,518 B2 * | 1/2015 | Whalen | 137/803 |
| 2007/0152104 A1 * | 7/2007 | Cueman | B64C 21/00 |
| | | | 244/198 |
| 2008/0149205 A1 * | 6/2008 | Gupta et al. | 137/829 |
| 2009/0165876 A1 * | 7/2009 | Atkin et al. | 137/825 |
| 2010/0044459 A1 | 2/2010 | Xu et al. | |
| 2010/0140416 A1 * | 6/2010 | Ohanian et al. | 244/23 A |
| 2013/0017094 A1 * | 1/2013 | Coupe et al. | 416/230 |
| 2013/0055889 A1 * | 3/2013 | Herz et al. | 92/96 |
| 2013/0187009 A1 * | 7/2013 | Golling | 244/203 |
| 2013/0195641 A1 * | 8/2013 | Povey | F01D 5/143 |
| | | | 415/208.2 |
| 2013/0266419 A1 * | 10/2013 | Richardson et al. | 415/1 |
| 2013/0284279 A1 * | 10/2013 | Richards | B64D 33/02 |
| | | | 137/15.1 |
| 2014/0196436 A1 * | 7/2014 | Watanabe | 60/204 |
| 2014/0271192 A1 * | 9/2014 | Brooks et al. | 416/23 |
| 2014/0356180 A1 * | 12/2014 | Oelofse | 416/225 |

OTHER PUBLICATIONS

Susan Althoff Gorton et al; Active Flow Control on a Boundary-Layer-Ingesting Inlet; American Institute of Aeronautics and Astronautics; pp. 1-12.

Scott J. Johnson et al; Active Load Control Techniques for Wind Turbines; Sandia Report, Aug. 2008; pp. 1-132.

European Search Report for European Patent Application No. EP 14 17 8046, dated Jun. 26, 2015. 9 pp.

\* cited by examiner

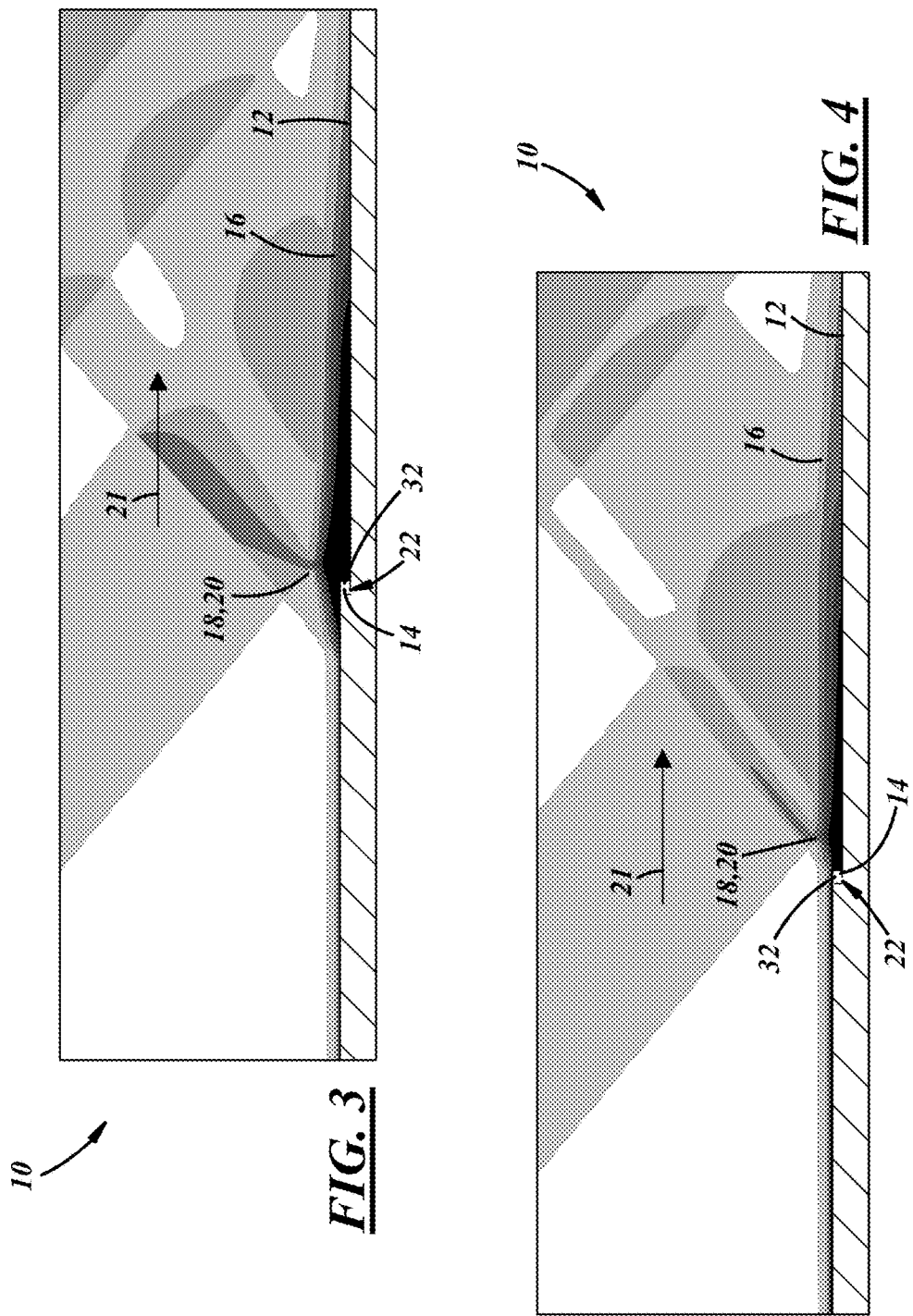

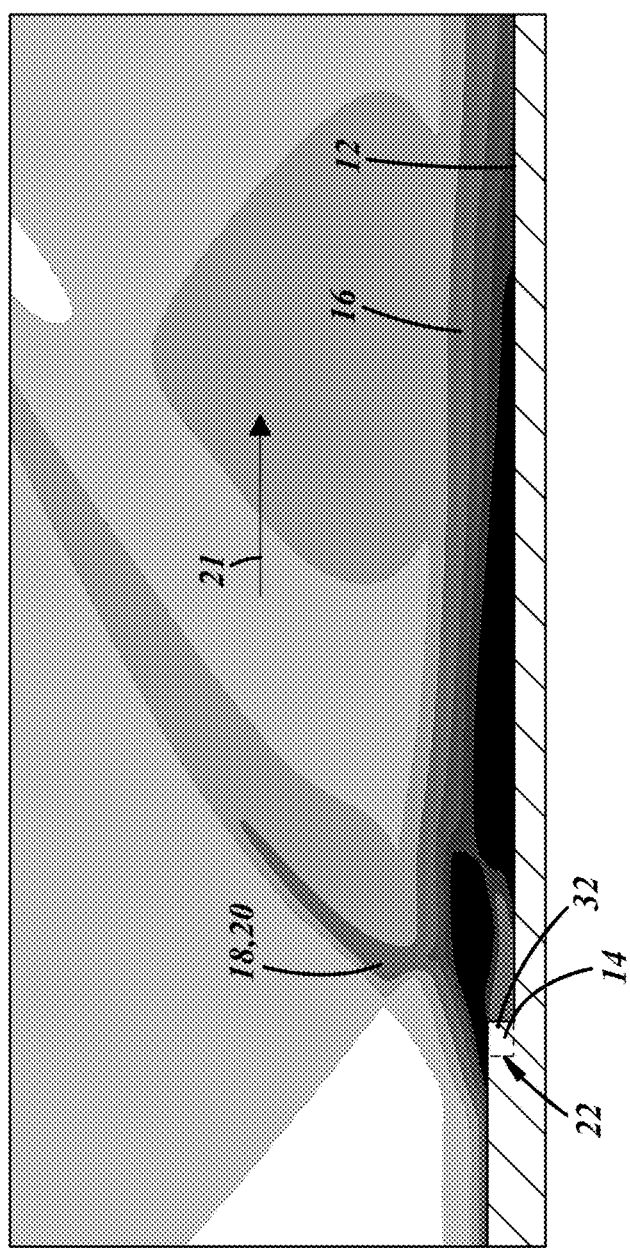

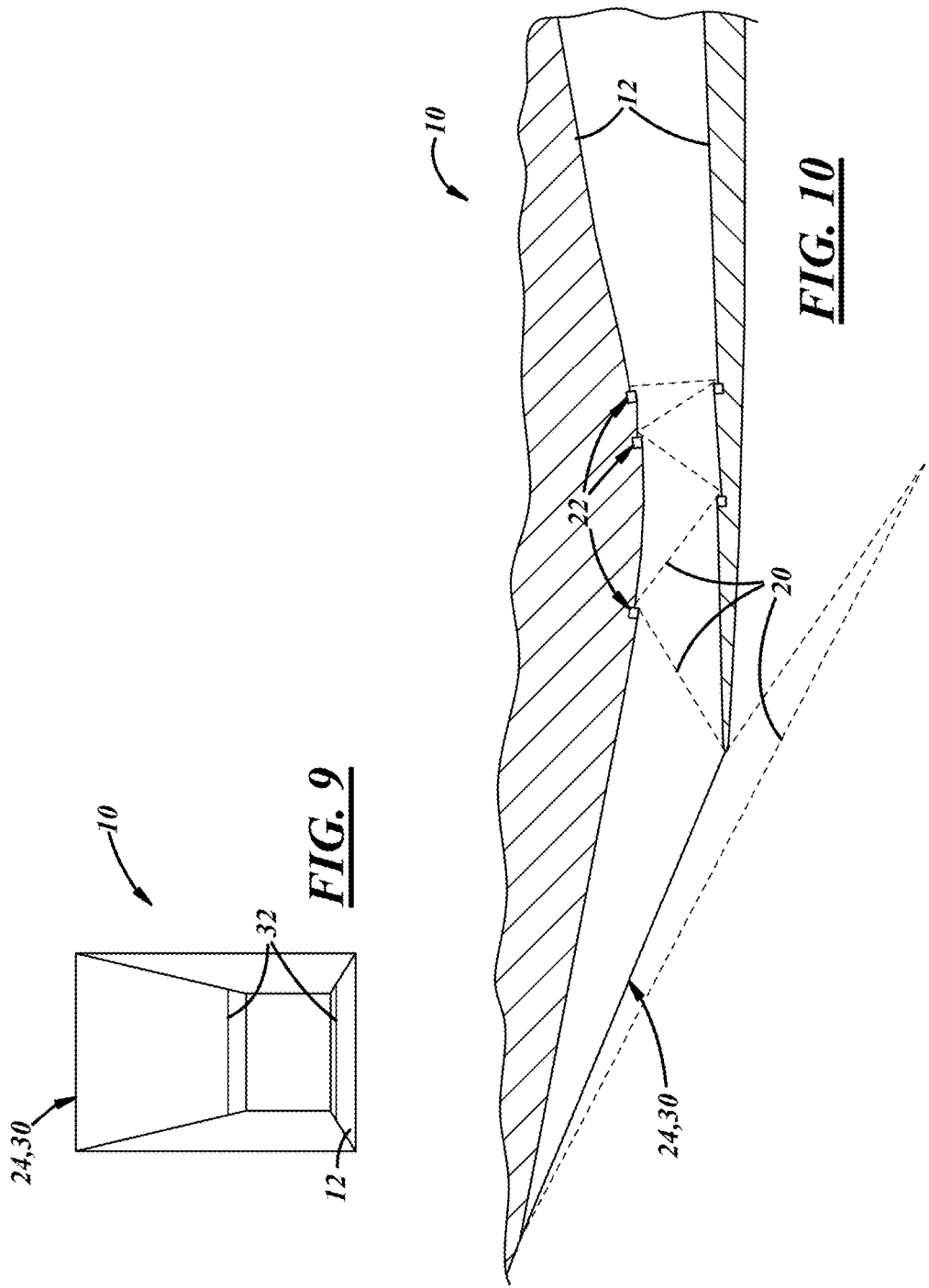

SUPRRESSION OF SHOCK-INDUCED AIRFLOW SEPARATION

CROSS-REFERENCES TO RELATED APPLICATIONS

Not Applicable

STATEMENT REGARDING FEDERALLY SPONSORED RESEARCH OR DEVELOPMENT

Not Applicable

BACKGROUND

Field

This application relates generally to the suppression of shock-induced separation of high speed jet inlet airflow from a relatively low-energy boundary layer.

Description of Related Art Including Information Disclosed Under 37 CFR 1.97 and 1.98

When operating at supersonic speeds, high speed jet inlets may develop shock waves in ricocheting patterns that disrupt inlet airflow. These shockwaves can cause flow separation of boundary layer air where the shockwaves contact interior walls of a jet engine inlet. As a result, bubbles of low-energy separated air can form around the points where shock waves touch the inlet walls.

SUMMARY

An apparatus is provided for suppressing shock-induced separation of high speed airflow from a relatively low-energy boundary layer of a fluid mass flowing along a wall. The apparatus comprises an actuator that is configured to alternately inhale and exhale fluid, and that is positioned to inhale fluid from a shock-induced boundary layer separation bubble.

Also, a method is provided for suppressing shock-induced separation of high speed airflow from a relatively low-energy boundary layer by drawing fluid from a boundary layer separation bubble induced along a wall by a supersonic shock wave propagated in a fluid mass.

DRAWING DESCRIPTIONS

These and other features and advantages will become apparent to those skilled in the art in connection with the following detailed description and drawings of one or more embodiments of the invention, in which:

FIG. 1 is a side cross-sectional view of an axisymmetric jet inlet showing supersonic shock wave locations, and locations for installing shock-induced separation suppression devices;

FIG. 2 is a fragmentary perspective view of a portion of the inlet of FIG. 1 and actuator arrays of a portion of one of the devices of FIG. 1 and, in the background, an airflow cross-section chart displaying Mach number contours (velocity magnitude non-dimensionalized by the local speed of sound), with a gray scale depicting high Mach number (high speed) in lighter shades and low Mach number (low speed) in darker shades;

FIG. 3 is a cross-sectional side view of the inlet portion shown in FIG. 2 with the device of FIG. 2 being shown in phantom and with the Mach contour cross-section chart representing airflow when the device is inactive;

FIG. 4 is a cross-sectional side view of the inlet portion shown in FIG. 2 with the device of FIG. 2 being shown in phantom and with the Mach contour cross-section chart representing airflow when the device is in an inhalation portion of its operation cycle;

FIG. 5 is a cross-sectional side view of the inlet portion shown in FIG. 2 with the device of FIG. 2 being shown in phantom and with the Mach contour cross-section chart representing airflow when the device is in an exhalation portion of its operation cycle;

FIG. 9 is a front end perspective view of a non-axisymmetric (or "2D") jet inlet; and FIG. 10 is a side cross-sectional view of the jet inlet of FIG. 9 showing supersonic shock wave locations, and locations for installing shock-induced separation suppression devices.

DETAILED DESCRIPTION

Figure 6:
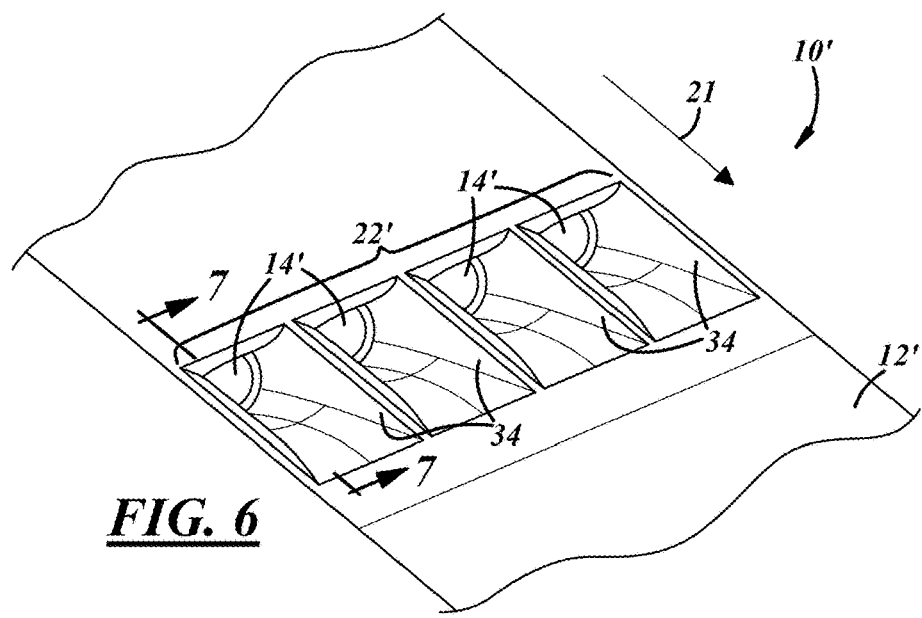
FIG. 6 is a fragmentary orthogonal view of an alternative device installation in an inlet wall.
Figure 7:
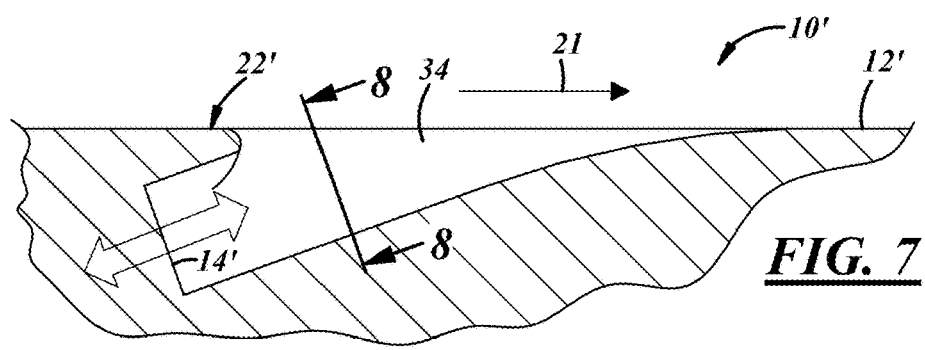
FIG. 7 is a cross-sectional view of the device and inlet wall of FIG. 6 taken along line 7-7 of FIG. 6.
Figure 8:
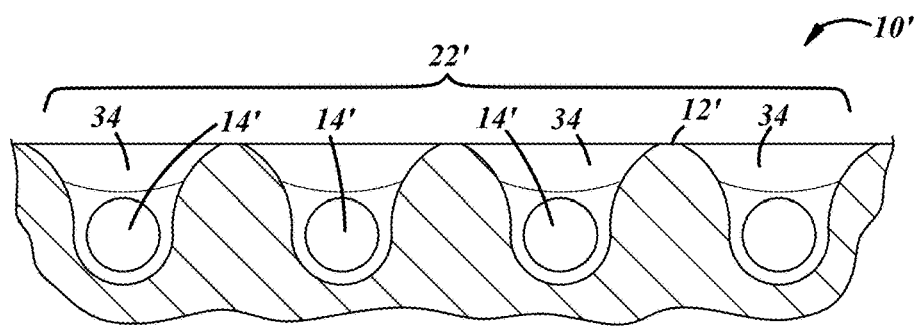
FIG. 8 is a cross-sectional view of the device and inlet wall of FIG. 6 taken along line 8-8 of FIG. 7.

An apparatus for suppressing shock-induced separation of high speed jet inlet airflow from a relatively low-energy boundary layer is generally shown at 10 in FIGS. 1-5, 9, and 10. A second embodiment is generally shown at 10' in FIGS. 6-8. Reference numerals with the designation prime (') in FIGS. 6-8 indicate alternative configurations of elements that also appear in the first embodiment. Unless indicated otherwise, where a portion of the following description uses a reference numeral to refer to FIGS. 1-5, 9, and 10, that portion of the description applies equally to elements designated by primed numerals in FIGS. 6-8.

Figure 2:
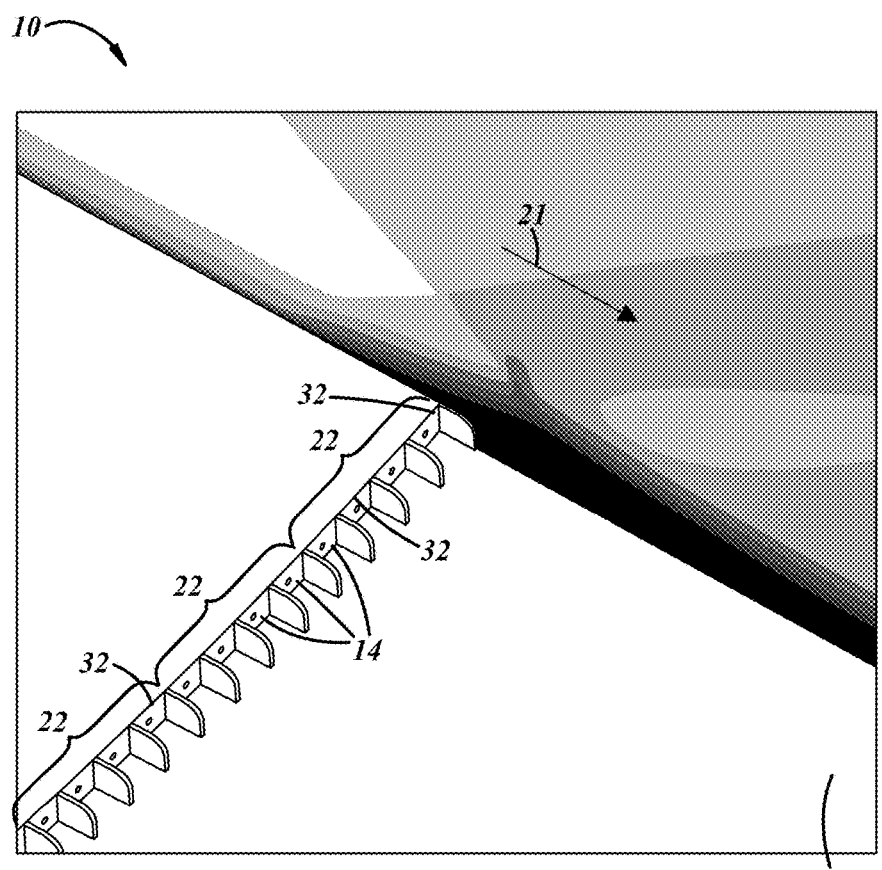

As shown in FIG. 2, the apparatus 10 may include one or more actuators 14 mounted to a wall 12. Each actuator 14 may be configured to alternately inhale and exhale fluid, such as air, at a rapid rate in an operation cycle. The actuators 14 may be zero-net-mass-flux (ZNMF) actuators, but in other embodiments may be any other suitable type of actuator.

As best shown in FIGS. 3-5, each actuator 14 may be located in a position along the wall where it can alternately inhale fluid from and exhale fluid into a relatively low-energy boundary layer of a fluid mass 16 flowing along the wall 12. Each actuator 14 may further be positioned such that an inhalation portion of its operation cycle may cause it to inhale low energy fluid from a flow separation region or boundary layer separation bubble 18 induced by a supersonic shock wave 20 propagated in the fluid mass 16. Each actuator 14 may also be positioned such that it will inhale fluid from a position downstream from an upstream end of the separation bubble 18 and upstream from a downstream end of the bubble 18. The actuators 14 of the apparatus 10 may also be positioned to energize a boundary layer by directing exhaled fluid back into the boundary layer in a generally downstream exhalation direction. So configured and positioned, the actuators 14 of the apparatus 10 are able to diminish or at least partially collapse the separation bubble 18 while energizing the boundary layer, thus preventing blockage, pressure losses, and possible unstart of an engine inlet.

As shown in FIG. 2, the apparatus 10 may include phased actuator arrays 22 that may each comprise at least two actuators 14 (four shown in FIG. 2). The actuators 14 may be disposed adjacent one another and arranged along the wall 12 transverse to a flow direction 21 of the fluid mass 16. Each actuator 14 of each array 22 may be configured to alternately inhale and exhale fluid at a rapid rate in an operation cycle, and each actuator 14 may be positioned to alternately inhale and exhale fluid from and into a boundary layer of a fluid mass 16 flowing along the wall 12. The operation cycles of the actuators 14 in a four-actuator array 22 may be phased with one another such that the cycle for each actuator 14 begins after the other three actuators in the array have completed 90, 180 and 270 degrees (i.e., one quarter, one half and three quarters) of their cycles. This phasing assures that "inhaling" is always occurring somewhere within each array 22, and overall fluctuations associated with the operation are smoothed. In other words, the drawing, directing, and alternating steps may include causing each of at least two ZNMF actuators to alternately inhale fluid from and exhale fluid into the boundary layer during respective operation cycles of the actuators 14. The operation cycles of the actuators 14 may be phased with one another such that the cycle of each actuator leads ahead or lags behind those of neighboring actuators in a precise manner to optimize performance and reduce overall vibration.

The duty cycle of each individual actuator 14 may also be modified to increase the portion of each cycle dedicated to the "inhale" (i.e., to inhale slowly and exhale quickly). This operating cycle configuration may further enhance the constancy of separation bubble diminution in the vicinity of the array 22.

As shown in FIG. 2, a plurality of phased actuator arrays 22 may be disposed adjacent one another and distributed along the wall 12 transverse to the flow direction of the fluid mass 16. The actuator arrays 22 may be disposed in respective locations where a boundary layer separation bubble 18 forms along the wall 12 when the fluid mass 16 is flowing, such that the arrays 22 are able to diminish a larger portion of a separation bubble 18 that forms along the wall 12 transverse to the flow direction.

Figure 1:
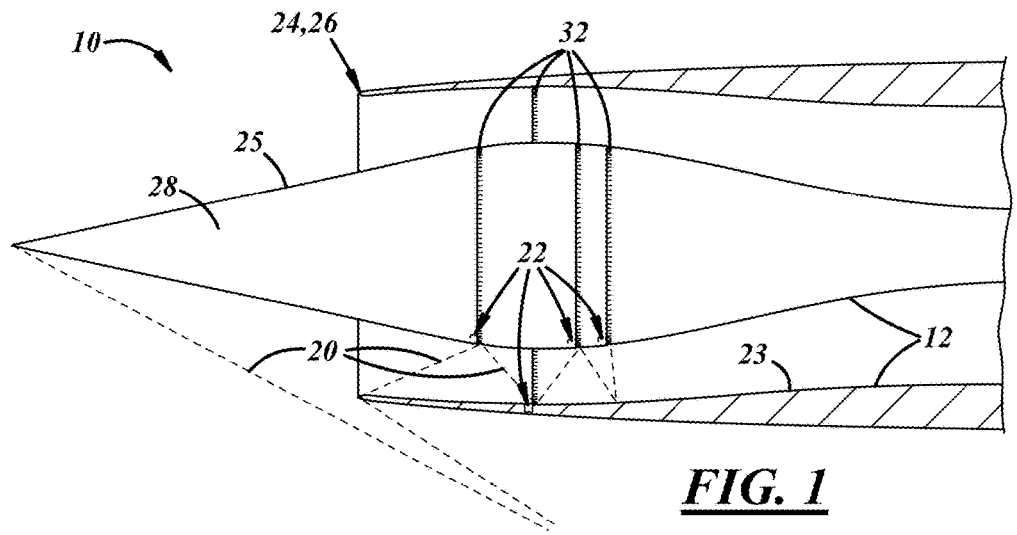

The wall 12 may be a continuous interior wall of an engine inlet 24. For example, and as shown in FIG. 1, the wall 12 may be either an inner circumferential inlet wall 23 or an outer circumferential compression spike wall 25. As shown in FIGS. 1 and 2, the plurality of phased actuator arrays 22 may be distributed in a continuous linear array around the continuous interior wall 12 of the engine inlet 24 to provide uniform diminishment of a separation bubble 18 that forms around the continuous interior wall 12. This distribution of arrays 22 may be applied with similar effectiveness whether the wall 12 is a continuous interior wall 23 of an axisymmetric mixed compression inlet 26 as shown in FIG. 1, an exterior surface 25 of a compression spike 28 in the axisymmetric inlet 26, or an interior surface of a non-axisymmetric (e.g., "2-D") mixed compression inlet 30 as shown in FIGS. 9 and 10.

As shown in FIGS. 2-5, the wall 12 may include a downstream-facing step 32, and the actuators 14 of the phased actuator array 22 may be positioned and oriented to inhale and exhale boundary layer fluid through the downstream-facing step 32. In a second embodiment, shown in FIGS. 6-8, each actuator 14' of the phased actuator array 22' may be positioned and oriented to inhale and exhale boundary layer fluid through a recessed wall port 34.

In practice, shock-induced separation of high speed jet inlet airflow from a relatively low-energy boundary layer may be suppressed by drawing low energy fluid from the boundary layer separation bubble 18 induced along a wall 12. This may be done by commencing an inhalation portion of an operation cycle of the ZNMF actuators 14 as shown in FIG. 4. The inhalation portion of the cycle may include causing the ZNMF actuators 14 to inhale fluid from a position downstream from the upstream end of the separation bubble 18 and upstream from the downstream end of the bubble 18. In other words, the actuators 14 may inhale fluid from an interior portion of the bubble 18.

Fluid may then be directed back into the boundary layer in a generally downstream exhalation direction by causing the ZNMF actuators 14 to commence an exhalation portion of the operation cycle as shown in FIG. 5. The exhalation portion of the cycle may comprise causing the ZNMF actuators 14 to alternately inhale fluid from and exhale fluid into the boundary layer at a rapid rate. The operational frequency of a ZNMF actuator is typically governed by its material properties, shape and size, which are driven by the environment and available volume for housing the installed actuator(s). A representative actuator for the wind turbine application would have a diameter, thickness, operational frequency and duty cycle (fraction of time spent exhaling) of approximately 3 inches, ¼ inch, 800 Hz and 50%, respectively. The maximum speed of the exhaled air may be several hundred feet per second (over half of the local speed of sound). However, actuators with different properties may be employed and operated at the conditions best suited for optimum performance.

The operation cycles of the actuators 14 may be phased with one another according to the number of actuators per array (e.g., 90 degrees of phasing for an array with 4 actuators). The operation cycles may be asymmetric, i.e., each actuator 14 may be slowed during its inhalation portion of the operation cycle, relative to the exhalation portion, such that more time is spent drawing fluid than directing it downstream. In other embodiments, however, each actuator 14 may be configured such that directing the fluid may require more time to complete than drawing the fluid. In other embodiments each actuator 14 may also be configured to alternate between operation cycles that prolong the drawing or directing of fluid.

An airflow separation suppression apparatus constructed and implemented as described above may prevent blockage, pressure losses, and possible unstart of an engine inlet, by diminishing, energizing, at least partially collapsing, and/or suppressing formation of a boundary layer separation bubble induced by a supersonic shock wave propagated in a fluid mass in a high speed jet inlet.

This description, rather than describing limitations of an invention, only illustrates embodiments of the invention recited in the claims. The language of this description is therefore exclusively descriptive and is non-limiting. Obviously, it's possible to modify this invention from what the description teaches. Within the scope of the claims, one may practice the invention other than as described above.

What is claimed is:

1. An apparatus for suppressing shock-induced separation of airflow, the apparatus comprising;
    an engine inlet; and
    an actuator configured to alternately inhale and exhale fluid, the actuator being positioned to inhale fluid from a boundary layer separation bubble induced on a wall of the inlet by a shock wave in a fluid mass flowing along the wall.

2. An apparatus as defined in claim 1 in which the actuator is positioned to direct exhaled fluid back into the boundary layer in a generally downstream exhalation direction.

3. An apparatus as defined in claim 1 in which the actuator is a zero-net-mass-flux (ZNMF) actuator.

4. An apparatus as defined in claim 2 in which the apparatus includes a phased actuator array comprising at least two actuators disposed adjacent one another and arranged along the wall transverse to a flow direction of the fluid mass, each actuator of the array being configured to alternately inhale and exhale fluid in an operation cycle of each actuator, and each actuator of the array being positioned to alternately inhale fluid from the boundary layer separation bubble and exhale fluid into the boundary layer, the operation cycles of the actuators being phased with one another such that the cycle of each actuator leads ahead of at least one other actuator of the array and lags behind at least one other actuator of the array.

5. An apparatus as defined in claim 4 in which the length of an inhalation portion of each actuator's operation cycle is adjustable relative to the length of an exhalation portion.

6. An apparatus as defined in claim 4 in which the apparatus includes a plurality of phased actuator arrays disposed adjacent one another and distributed along the wall transverse to the flow direction of the fluid mass, in respective locations where the boundary layer separation bubble forms along the wall when the fluid mass is flowing.

7. An apparatus as defined in claim 6 in which the wall is a generally continuous interior wall of an engine inlet and the plurality of phased actuator arrays are distributed around the generally continuous interior wall of the engine inlet.

8. An apparatus as defined in claim 7 in which the wall is a generally continuous interior wall of an axisymmetric mixed compression inlet.

9. An apparatus as defined in claim 4 in which the actuators of the phased actuator array are positioned and oriented to inhale and exhale boundary layer fluid through a downstream-facing step in the wall.

10. An apparatus as defined in claim 4 in which the actuators of the phased actuator array are positioned and oriented to inhale and exhale boundary layer fluid through a recessed wall port.

11. A method for suppressing shock-induced airflow separation, the method including the steps of:
drawing a fluid mass into an engine inlet such that a supersonic shock wave propagates in the fluid mass and induces a boundary layer separation bubble in a portion of the fluid mass flowing along a wall of the inlet; and
drawing fluid from the boundary layer separation bubble.

12. The method of claim 11 including the additional step of directing fluid back into the boundary layer in a generally downstream exhalation direction.

13. The method of claim 11 in which the step of drawing fluid from a boundary layer separation bubble includes causing a ZNMF actuator to inhale fluid from the boundary layer separation bubble during an inhalation portion of an operation cycle of the ZNMF actuator.

14. The method of claim 12 in which the step of directing fluid back into the boundary layer includes causing the ZNMF actuator to direct fluid back into the boundary layer in a generally downstream exhalation direction during an exhalation portion of the operation cycle of the ZNMF actuator.

15. The method of claim 12 including the additional step of causing the ZNMF actuator to alternately inhale fluid from and exhale fluid into the boundary layer.

16. The method of claim 15 in which the drawing, directing, and alternating steps include causing each of at least two ZNMF actuators to alternately inhale fluid from and exhale fluid into the boundary layer during respective operation cycles of the actuators, the operation cycles of the actuators being phased with one another such that the cycle of each actuator leads ahead of at least one other actuator of the array and lags behind at least one other actuator of the array.

17. The method of claim 12 in which the step of alternating the drawing and directing steps includes the additional step of slowing or speeding the actuator during one of the drawing step and the directing step such that one of the drawing step and the directing step takes more time to complete than the other.

18. The method of claim 17 in which the step of alternating the drawing and directing steps includes slowing the drawing step or speeding the directing step such that the drawing step takes more time to complete than the directing step.

19. An apparatus as defined in claim 1 in which the actuator is positioned to inhale fluid from a boundary layer separation bubble induced along the wall of the inlet by a supersonic shock wave reflected from the wall.

20. A method as defined in claim 11 in which the step of drawing a fluid mass into an engine inlet such that a supersonic shock wave propagates in the fluid mass and induces a boundary layer separation bubble, includes drawing the fluid mass into an engine inlet such that the supersonic shock wave induces the boundary layer separation bubble to form where the shock wave is reflected from the inlet wall.

* * * * *